United States Patent [19]

Burow et al.

[11] Patent Number: 4,620,879

[45] Date of Patent: Nov. 4, 1986

[54] IRON OXIDE YELLOW PIGMENTS HAVING A LOW SILKING EFFECT AND A PROCESS FOR PRODUCTION THEREOF

[75] Inventors: Wilfried Burow; Helmut Printzen; Horst Brünn; Klaüs Nollen, all of Krefeld, Fed. Rep. of Germany

[73] Assignee: Bayer Aktiengesellschaft, Leverkusen, Fed. Rep. of Germany

[21] Appl. No.: 629,654

[22] Filed: Jul. 11, 1984

[30] Foreign Application Priority Data

Jul. 23, 1983 [DE] Fed. Rep. of Germany ....... 3326632

[51] Int. Cl.$^4$ .............................................. C09C 1/62
[52] U.S. Cl. ..................................... 106/304; 106/309
[58] Field of Search ................................ 106/304, 309

[56] References Cited

U.S. PATENT DOCUMENTS

| 2,388,659 | 11/1945 | Ryan et al. | 423/633 |
|---|---|---|---|
| 3,867,516 | 2/1975 | Bodson | 106/304 |
| 3,918,985 | 11/1975 | Ebenhoech et al. | 106/304 |
| 4,292,294 | 9/1981 | Patil et al. | 106/304 |
| 4,374,677 | 2/1983 | Senda et al. | 106/309 |
| 4,376,656 | 3/1983 | Senda et al. | 106/309 |
| 4,459,276 | 7/1984 | Nobuoka et al. | 106/304 |

OTHER PUBLICATIONS

International Organization for Standardization, 1982 (ISO/DIS 7724, 1-3 drafts), "Paints and Varnishes—Colorimetry", Part 1, 2 and 3.

*Primary Examiner*—Paul Lieberman
*Assistant Examiner*—Willie J. Thompson
*Attorney, Agent, or Firm*—Sprung Horn Kramer & Woods

[57] ABSTRACT

Iron oxide yellow pigments having a silking effect $\Delta E_1^*$, less than or equal to 0.5, and having color values which range for L* from 52-63, for a* from 8 to 14 and for b* from 40 to 48 CIELAB units are produced by a process by first, forming needle-shaped $\alpha$-FeOOH yellow pigment nuclei in the presence of compounds containing the elements B, Al, Ga, Si, Ge, Sn or Pb present in a quantity of from 0.05 to 10% by weight, where the quantity is calculated as the tri- or tetra-valent oxides of the compounds and based on the $\alpha$-FeOOH which is precipitated during nucleation, and second, growing iron oxide yellow pigments on the thus formed iron oxide yellow nuclei.

11 Claims, 1 Drawing Figure

4,620,879

IRON OXIDE YELLOW PIGMENTS HAVING A LOW SILKING EFFECT AND A PROCESS FOR PRODUCTION THEREOF

BACKGROUND OF THE INVENTION

1. Field of the Invention

This invention relates to iron oxide pigments which have a low silking effect and to a process for the production thereof.

2. Description of the Prior Art

Iron oxide yellow ($\alpha$-FeOOH) pigments may be produced by the precipitation of iron salt solutions and oxidation with air (U.S. Pat. No. 2,388,659); or with other oxidizing agents, optionally in the presence of metallic iron (DE-PS No. 902,163); or they may be produced by the oxidation of metallic iron with oxidizing agents, in particular with aromatic nitro compounds (DE-PS No. 517,758).

Such iron oxide yellow pigments are used in the building material, plastics and lacquer industries.

The particle size and the length:width ratio of the needle-shaped iron oxide particles are primarily responsible for the optical properties of the iron oxide yellow pigments. The pigments become brighter and purer in color as the particle length: width ratio increases.

In paintings or articles pigmented with coating compositions which contain distinctly needle-shaped yellow iron oxide pigments, i.e. those pigments which are bright and pure in color, clearly perceptible color differences become visible. These color differences, known as silking effect, are dependent on the direction of observation of the painting or pigmented article. The silking occur when the pigments become orientated in a privileged direction when they are processed into a lacquer or film, which direction is parallel to the axis of the needles. Such color differences, which depend on the direction of observation of the paintings or pigmented articles are known from multi-colored silk fabrics. Since the absorption and scattering coefficients of conventional needle-shaped iron oxide yellow pigments are different in the longitudinal direction than in the direction perpendicular to the needle axis, the silking effect and thus the color difference is greatest when the needles are first oriented perpendicularly and then parallel to the direction of observation of the pigmented articles. Disturbing color shades are observed when areas having different orientations of the needle-shaped pigments meet. They become visible at the corners of door frames or window frames if the needle-shaped pigments are oriented parallel to the direction of observation when paint is applied to the vertical edges, and if they are oriented perpendicularly to the direction of observation when paint is applied to the horizontal edges.

The so-called picture frame effect is particularly disturbing. This effect occurs when a painter brushes along an edge a second time as he finishes painting a relatively large surface, in order to even out the edge. Since this orients the needle-shaped pigments in one privileged direction at the edge of the surface, it gives the impression that the surface is framed with a different color.

It is possible to reduce the degree of silking of iron oxide yellow pigments by mixing needle-shaped iron oxide pigments with isometric yellow pigments, such as nickel rutile yellow. Isometric pigments do not naturally exhibit a silking effect.

Isometric iron oxide yellow pigments are of limited use because they are dark and unsaturated in color. However, other isometric yellow pigments are also of limited use because they are several times more expensive than iron oxide pigments.

Thus, an object of the present invention is to provide bright yellow iron oxide pigments which are pure in color and which are virtually free of the undesired "Silking" properties.

This object is achieved by means of highly-branched needle-shaped iron oxide yellow pigments which have such a high degree of branching that, optically, they behave almost like isometric pigments, and they combine the desired favorable color properties with a silking effect which is virtually no longer perceptible.

SUMMARY OF THE INVENTION

Accordingly the present invention provides iron oxide yellow pigments, which are virtually free of undesired silking properties. These yellow pigments have color values, which have CIECAB units, which range for L* from 52 to 63, for a* from 8 to 14 and for b* from 40 to 48, where the color values are measured according to German Industrial Standard 6174 (equivalent to ISO/DIN 7724, 1–3 drafts) at a 10% pigment volume concentration (PVC) in Alkydal F 48 lacquer (a medium oil-length alkyd resin, oil content 48%, based on natural fatty acids, a trade product of BAYER AG).

Iron oxide yellow pigments, having color values which have CIELAB units which range for L* from 54 to 61, for a* from 8.5 to 13 and for b* from 42 to 48 are particularly preferred.

This invention also provides a process for the production of the pigments according to the present invention.

DETAILED DESCRIPTION OF THE PREFERRED EMBODIMENTS

Figure 1:
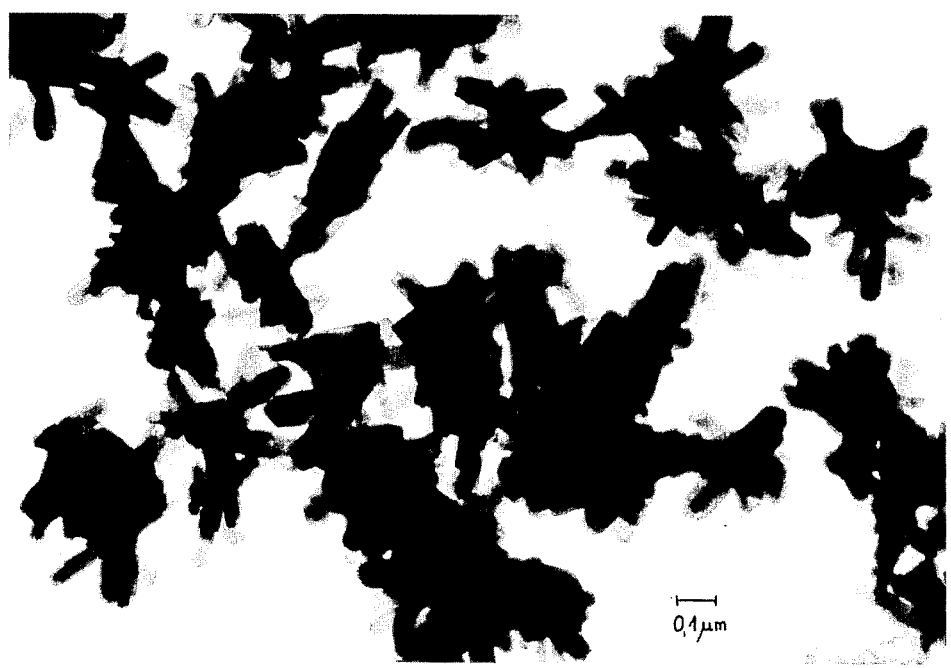
FIG. 1 is a photomicrograph of iron oxide yellow pigments obtained in accordance with the invention.

Surprisingly, the pigments of this invention are produced in a two-stage process. In the first stage, nucleation, the nuclei of needle-shaped $\alpha$-FeOOH yellow pigments are formed in the presence of componds of the elements B, Al, Ga, Si, Ge, Sn or Pb present in a quantity of from 0.05 to 10% by weight, where the quantity of calculated as the tri- or tetra-valent oxides of the compounds and based on the $\alpha$-FeOOH which is precipitated during nucleation. In the second step, pigment formation, an iron oxide yellow pigment is allowed to grow in a conventional manner on the thus formed $\alpha$-FeOOH nucleus.

Thus, in the first stage of the process, an $\alpha$-FeOOH nucleus is produced in the presence of compounds having a content of from 0.05 to 10%, preferably from 0.15 to 7% by weight of B, Al, Ga, Si, Ge, Sn, or Pb calculated as tri- or tetravalent oxides of the compounds based on $\alpha$-FeOOH which is precipitated during nucleation. Suitable compounds include the water soluble salts of B, Al, Ga, Si, Ge, Sn or Pb. Representative compounds include alkalisilicates, $Na_2SiO_3 \cdot 9H_2O$, $Al_2(SO_4)_3 \cdot 18H_2O$, $SnCl_4$. Silicates and aluminates are mentioned as being particularly preferred compounds within the context of this invention. This nucleus is formed according to known production processes from iron-(II-salt solutions at room temperatures or at a higher temperature. Representative iron-(II)-salt solutions include iron-(II)- sulphate solutions and iron-(II)-chloride solutions. Representative basic precipitants include alkali oxides and alkaline earth oxides or hydroxides and carbonates, and ammonia. The thus formed iron-(II)-hydroxides are preferably oxidized by introducing air, but other oxidizing agents may also be used during nucleation. Representative oxidizing agents include oxygen, chlorine, nitric acid or nitrate, chlorates and in particular organic nitro compounds, such as nitrobenzene. In the second stage of the process, a pigment is allowed to grow on the iron oxide yellow nucleus which is produced according to the first stage of the invention. The second stage is carried out according to various known production processes, such as by precipitation with the addition of iron-(II)- salts, precipitants and oxidation with air or other oxidizing agents, optionally in the presence of metallic iron, or by oxidation of metallic iron using aromatic nitro compounds (DE-A No. 3,028,679).

It will be obvious to one skilled in the art after reading the teachings of this specification that both steps of the process may be carried out according to variants which are known from the prior art.

After the second stage "Hedgehog-shaped", low silking iron oxide yellow pigments are obtained. (see FIG. 1). The thus formed pigments should be ground carefully, as is conventional for iron oxide yellow pigments.

The pigments which are produced according to the present invention are distinguished relatively easily and rapidly from other yellow pigments by determining the Silking effect by colorimetry.

Since the silking effect is at its greatest visually when areas border on each other, areas in which the needle-shaped yellow pigment is first oriented to the direction of observation and then transversely to the direction of observation, the color difference which occurs as a result of these orientations is used as a measurement of the magnitude of the Silking effect. To determine the silking effect, the color difference between a normal sample with the pigment oriented in a privileged direction and with the sample rotated by 90° is determined. The total color difference which is determined is a measurement of the magnitude of the Silking effect.

The privileged direction is determined by the brushing, rolling, applying on or rub-out direction of the sample (U. Kaluza, Phys, chem. Grundlagen der Pigmentverarbeitung für Lacke and Druckfarben, Filderstadt 1980, S. 91+92).

Method for measuring the silking effect 0.800 g of pigments (corresponding to 10% of PVC in a dry lacquer film) is combined with 4.35 cm$^3 \hat{=}$ 4.09 g of the binder solution Alkydal F 48 (trade product of BAYER AG, density of 0.94 g/cm$^3$; dry residue 44%) by first mashing all the pigment with half the binder solution on a lower plate of a color muller-machine (company: Engelsmann, Ludwigshafen), (strain: 1 additional weight, 2.5 kg). The mash is ground at 100 rotations. Then the thus formed paste is taken up, distributed outside the center point of the glass plate and reduced with the second half of the binder solution.

After a further 100 rotations (color muller-machine under no strain), the thus formed grinding is immediately applied onto a white cartoon, which is lined on one side, using a film applicator (gap with 8 cm, gap height 150 μm). The lined side is covered.

After a drying time of 25 minutes (the time may vary with different drying conditions, such as temperature and air moisture, the first third (field 1) of the test sample is left without further treatment. The second third (field 2) of the sample is rubbed with the tip of the index finger with as even a pressure as possible transversely to the application-direction (always from left to right) and the last third (field 3) is treated in the same way as the second except rubbed in the direction (rub-out). The sample is dried overnight.

The color values $R_x$, $R_y$ and $R_z$ of the fields 1 to 3, respectively, are each measured twice, first parallel to and then rotated by 90° C. with respect to the application-direction. The color difference, $\Delta E_{ab}^*$, between the color values of each individual field is calculated. It is possible to read the extent of the Silking effect from the color differences of the three fields. The measurement is made using a colorimeter "Color-Master" having 45°/0° geometry with color filters FMX/C, FMY/C and FMZ/C, and with an enamel standard as the secondary standard.

TABLE

| CIELAB color difference acc. to DIN 6174 [$^{CIELAB}$ C/2 grd] for field 1 (8 grd/d) | | | | | | | | |
|---|---|---|---|---|---|---|---|---|
| Measurement values | $R_{x1}$ | $R_{y1}$ | $R_{z1}$ | $l_1^*$ | $a_1^*$ | $b_1^*$ | $C_1^*$ | $h_1$ |
| Field 1 parallel | 33.89 | 24.18 | 3.85 | 56.3 | 14.9 | 57.1 | 59.0 | 75.4 |
| rotated by 90° | 33.77 | 24.04 | 3.74 | 56.1 | 15.1 | 57.5 | 59.4 | 75.3 |
| Color difference | $\Delta E_1^*$ | $\Delta L_1^*$ | $\Delta a_1^*$ | $\Delta b_1^*$ | $\Delta C_1^*$ | $\Delta H_1$ | $\Delta h_1$ | |
|  | 0.5 | −0.1 | 0.1 | 0.4 | 0.4 | −0.0 | −0.0 | |

In the calculation Example of the Table, the value of the total color difference of field 1, $\Delta E_1^*$, the silking behavior, is 0.5.

The values $\Delta E_2^*$ and $\Delta E_3^*$ for fields 2 and 3 are calculated in the same way, from the color values of fields 2 and 3. The measurements of $\Delta E_2^*$ and $\Delta E_3^*$ are each done twice. For fields 2 and 3, the "rub-out" which was not effected for field 1 is performed manually, once perpendicularly (field 2) and then parallel (field 3) to the application direction. The amounts $\Delta E_2^*$ and $\Delta E_3^*$ are the same upon an equivalent manual implementation of the "rub-out" in fields 2 and 3. The constituent values $L_2^*$, $\Delta a_2^*$ to $\Delta h_2$, or $\Delta L_3^*$, $\Delta a_3^*$ to $\Delta h_3$ must bear opposite signs.

The yellow iron oxide pigments according to the present invention are well suited to tinting lacquers and plastics films.

The process according to this invention will now be described by way of example in the following, without thereby restricting the invention.

EXAMPLE 1

A yellow oxide nucleus suspension is formed by adding 55.8 g of $Na_2SiO_3.9H_2O$ (dissolved in 150 ml of $H_2O$) to 6.804 liters of $FeSO_4$ solution containing 1020.6 g of $FeSO_4$ in a high-grade steel container, and heating to 55° C. over a period of 30 minutes. The $FeSO_4$ solution is mixed with 750 ml of 9n NaOH and oxidized with 450 l/h of air at 55° C. until the pH value is $\leq 2.8$. The pH is measured by a glass electrode placed in the thus formed suspension. 9.6 liters of $H_2O$ are added under nitrogen to 2.4 liters of the yellow nucleus suspension and the suspension is heated to 80° C. under nitrogen. 4.26 liters of 4.75 n NaOH and 6.9 liters of $FeSO_4$, containing 1380 g of $FeSO_4$ are then added dropwise over a period of 12 hours at 80° C. and while gassing with 1,000 l/h of air, such that the pH of the suspension remains constant and is 4.0±0.1. The product is washed until it is free of sulphate, dried and then ground in a dismembrator.

EXAMPLE 2

25.71 g of $Al_2(SO_4)_3.18H_2O$ (dissolved in 71 ml of $H_2O$) are added to 9.72 liters of $FeSO_4$ solution containing 1458 g of $FeSO_4$ in a high-grade steel container, and heated to 55° C. over a period of 30 minutes. The $FeSO_4$ solution is mixed with 1072 ml of 9n NaOH and oxidized with 650 l/h of air at 55° C. until the pH value is 2.8. 7.516 liters of $H_2O$ are added under nitrogen to 2.484 liters of the yellow nucleus suspension thus obtained and heated to 80° C. under nitrogen. 6.9 liters of 4.75 n NaOH and 10.74 liters of $FeSO_4$ containing 2148 g of $FeSO_4$ are then added dropwise over a period of 18 hours at 80° C. and while gassing with 100 l/h of air such that the pH in the suspension is constantly 4.0±0.1. The product is washed until it is free of sulphate and is ground in a dismembrator.

EXAMPLE 3

167.4 g of $Na_2SiO_3.2H_2O$ (dissolved in 400 ml of $H_2O$ are added to 15.309 liters of $FeSO_4$ solution containing 3061.8 g of $FeSO_4$ in a high-grade steel container, and heated to 55° C. over a period of 30 minutes. The $FeSO_4$ solution is mixed with 2250 ml of 9n NaOH and oxidized with 450 l/h of air at 55° C. until the pH value is ≦2.8. 7.129 liters of $H_2O$ are added under nitrogen to 2.781 liters of the yellow nucleus suspension thus obtained and heated to 80° C. under nitrogen. 6.62 liters of 4.75 n NaOH and 11.18 liters of $FeSO_4$ containing 2236 g of $FeSO_2$ are then added dropwise over a period of 12 hours at 80° C. and while gassing with 1,000 l/h of air, such that the pH of the suspension remains constant and is 4.0±0.1. The product is washed until it is free of sulphate, dried and is then ground in a dismembrator.

EXAMPLE 4

117 g of $Al_2(SO_4)_3.18H_2O$ (dissolved in 250 ml of $H_2O$) are added to 15.309 liters of $FeSO_4$ solution containing 3061.8 g of $FeSO_4$ in a high-grade steel container, and heated to 55° C. over a period of 30 minutes. The $FeSO_4$ solution is mixed with 2250 ml of 9 n NaOH and oxidized with 400 l/h of air at 55° C. until the pH value is ≦2.8. 7.129 liters of $H_2O$ are added under nitrogen to 2.777 liters of the yellow nucleus suspension thus obtained and heated to 80° C. under nitrogen. 10.746 liters of $FeSO_4$ containing 2149.2 of $FeSO_4$, and 7.530 liters of 4.75 n NaOH are then added dropwise over a period of 12 hours at 80° C. and while gassing with 1,000 l/h of air, such that the pH of remains is constant and is 4.0±0.1. The product is washed until it is free of sulphate, dried and then ground in a dismembrator.

TABLE 4

| Color data and the silking effect of iron oxide pigments produced according to the present invention | | | | | |
|---|---|---|---|---|---|
| Example | $\Delta E_1^*$ | $\Delta E_2^*$ | $\Delta E_3^*$ | $L^*$ | $a^*$ | $b^*$ |
| 1 | 0.3 | 0.3 | 0.2 | 55.2 | 9.5 | 40.0 |
| 2 | 0.4 | 0.5 | 0.6 | 58.1 | 9.3 | 44.9 |
| 3 | 0.2 | 0.4 | 0.3 | 55.7 | 9.9 | 44.9 |
| 4 | 0.1 | 0.6 | 0.7 | 54.9 | 12.1 | 40.0 |
| 5 | 0.3 | 0.9 | 1.0 | 55.1 | 12.9 | 41.4 |
| 6 | 0.9 | 2.3 | 2.3 | 59.4 | 11.4 | 43.7 |
| 7 | 0.2 | 0.9 | 0.7 | 55.8 | 12.2 | 42.1 |
| 8 | 0.4 | 1.3 | 1.1 | 58.4 | 9.6 | 44.0 |

EXAMPLE 5

Iron oxide yellow pigment which is produced, washed and dried according to the directions given in Example 3 is ground in a cross-beater mill.

EXAMPLE 6

Iron oxide yellow pigment which is produced, washed and dried according to the directions given in Example 3 is ground in a steam jet mill (product: steam ratio=1:3).

EXAMPLE 7

351 g of $Al_2(SO_4)_3.18H_2O$ (dissolved in 400 ml of water) are added to 15.309 liters of $FeSO_4$ solution containing 3061.8 g of $FeSO_4$ in a high-grade steel container. The $FeSO_4$ solution is mixed with 2250 ml of 9 n NaOH and oxidized with 400 l/h of air at 55° C. until the pH value is ≦2.8 7.022 liters of water are added under nitrogen to 2.978 liters of the yellow nucleus suspension thus obtained and heated to 80° C. under nitrogen. 7 liters of $FeSO_4$ solution containing 1400 g of $FeSO_4$, and 3.995 liters of NaOH (4.75 n) are then added dropwise over a period of 13 hours at 80° C. and while gassing with 1,000 l/h of air, such that the pH of the suspension remains constant and is 4.0±0.1. The product is washed until it is free of sulphate, dried and then ground in a dismembrator.

EXAMPLE 8

58.95 g of $SnCl_4$ (dissolved in 20 ml of concentrated HCl and 400 ml of $H_2O$) are added to 15.309 liters of $FeSO_4$ solution containing 3061.8 g of $FeSO_4$ in a high-grade steel container, and heated to 55° C. over a period of 30 minutes. The $FeSO_4$ solution is mixed with 2250 ml of 9 n NaOH and oxidized with 400 l/h of air at 55° C. until the pH value is ≦2.8. 7.452 liters of water are added under nitrogen to 2.548 liters of the nucleus suspension thus obtained and are heated to 80° C. under nitrogen. 22.86 l of $FeSO_4$ solution containing 4472 g of $FeSO_4$, and 17.83 liters of NaOH (4.75 n) are then added dropwise over a period of 25 hours at 80° C. and while gassing with 1,000 l/h of air, such that the pH of the suspension remains constant and is 4.0±0.1. The product is washed until it is free of sulphate, dried and then ground in a dismembrator.

What is claimed is:

1. Iron oxide yellow pigments having a silking effect of 0.5 or less and having color values which have CIE-LAB units in the range of from 52 to 63 for L*, from 8 to 14 for a* and from 40 to 48 for b*, measured according to German Industrial Standard 6174 at a 10% pigment volume concentration (PVC) in a medium oil-length alkyd resin having an oil content of 48% based on natural fatty acids and having a density of 0.94 g/cm³ and dry residue of 44% (trade product of BAYER AG).

2. Iron oxide yellow pigments according to claim 1, having color values which have CIELAB units in the range of from 54 to 61 for L*, from 8.5 to 13 for a* and from 41 to 48 for b*.

3. A process for the production of iron oxide yellow pigments having a silking effect of 0.5 or less and having color values which have CIELAB units in the range of from 52 to 63 for L*, from 8 to 14 for a* and from 40 to 48 for b* measured according to German Industrial Standard 6174 at 10% pigment volume concentration (PVC) in a medium oil-length alkyd resin having an oil content of 48% based on natural fatty acids and having a density of 0.94 g/cm$^3$ and dry residue of 44% comprising first forming needle-shaped α-FeOOH yellow pigment nuclei in the presence of at least one compound containing the elements B, Al, Ga, Si, Ge, Sn or Pb present in a quantity of from 0.05 to 10% by weight where the quantity is calculated as the tri- or tetravalent oxides of the compounds and based on the α-FeOOH which is precipitated during nucleation, and second, growing iron oxide yellow pigments on the thus formed yellow pigment nuclei.

4. A process for the production of iron oxide yellow pigments having a silking effect of 0.5 or less and having color values which have CIELAB units in the range of from 54 to 61 for L*, from 8.5 to 13 for a* and from 41 to 48 for b* measured according to German Industrial Standard 6174 at a 10% pigment volume concentration (PVC) in a medium oil-length alkyd resin having an oil content of 48% based on natural fatty acids and having a density of 0.94 g/cm$^3$ and dry residue of 44% comprising, first forming needle-shaped α-FeOOH yellow pigment nuclei in the presence of at least one compound containing the elements B, Al, Ga, Si, Ge, Sn or Pb present in a quantity of from 0.05 to 10% by weight, where the quantity is calculated as the tri- or tetravalent oxides of the compounds and based on the α-FeOOH which is precipitated during nucleation, and second, growing iron oxide yellow pigments on the thus formed yellow pigment nuclei.

5. A process according to claim 3, wherein the quantity of the compounds if from 0.15 to 7% by weight.

6. A process according to claim 4, wherein the quantity of the compounds is from 0.15 to 7% by weight.

7. A process according to claim 3, wherein the compounds are silicates and/or aluminates.

8. A process according to claim 4, wherein the compounds are silicates and/or aluminates.

9. A process according to claim 5, wherein the compounds are silicates and/or aluminates.

10. A process according to claim 6, wherein the compounds are silicates and/or aluminates.

11. A process according to claim 3, further comprising grinding the iron oxide yellow pigments.

* * * * *